(12) United States Patent
Steinborn et al.

(10) Patent No.: US 8,870,712 B2
(45) Date of Patent: Oct. 28, 2014

(54) METHOD FOR SHIFT CONTROL OF AN AUTOMATED GROUP GEAR

(75) Inventors: Mario Steinborn, Friedrichshafen (DE); Roland Mair, Tettnang (DE); Florian Schneider, Lindenberg (DE); Jochen Breuer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/237,964

(22) PCT Filed: Jul. 5, 2012

(86) PCT No.: PCT/EP2012/063124

§ 371 (c)(1),
(2), (4) Date: Feb. 10, 2014

(87) PCT Pub. No.: WO2013/020761

PCT Pub. Date: Feb. 14, 2013

(65) Prior Publication Data

US 2014/0171263 A1    Jun. 19, 2014

(30) Foreign Application Priority Data

Aug. 11, 2011 (DE) .......................... 10 2011 080 849

(51) Int. Cl.
| | |
|---|---|
| *B60W 10/00* | (2006.01) |
| *F16H 61/70* | (2006.01) |
| *B60W 10/11* | (2012.01) |
| *B60W 10/04* | (2006.01) |
| *F16H 61/04* | (2006.01) |
| *F16H 61/08* | (2006.01) |
| *F16H 63/50* | (2006.01) |

(52) U.S. Cl.
CPC ........ *B60W 10/11* (2013.01); *F16H 2061/0422* (2013.01); *F16H 61/702* (2013.01); *F16H 2061/085* (2013.01); *F16H 61/0403* (2013.01); *F16H 63/502* (2013.01); *B60W 10/04* (2013.01)
USPC ............................................ 477/77; 475/209

(58) Field of Classification Search
USPC ................. 477/79, 41, 77, 80, 115, 166, 181; 475/207, 209, 218
See application file for complete search history.

(56) References Cited

U.S. PATENT DOCUMENTS 6,012,345 A * 1/2000 Wafzig et al. ..................... 74/50
7,526,975 B2   5/2009 Fischer et al.
(Continued)

FOREIGN PATENT DOCUMENTS

DE   10 2005 002 496 A1   7/2006
DE   10 2007 010 829 A1   9/2008
(Continued)

OTHER PUBLICATIONS

German Search Report Corresponding to 10 2011 080 849.3 mailed Mar. 20, 2012.
(Continued)

*Primary Examiner* — Justin Holmes
(74) *Attorney, Agent, or Firm* — Davis & Bujold, PLLC; Michael J. Bujold (57) ABSTRACT

A method of controlling a shift of an automated group gearbox having a multi-step main transmission and a trailing two-step range group. An input shaft of the main transmission is driven by a drive device. The main transmission and a range group have synchronization devices with shift clutches. Each synchronization device, for the main transmission, has two shift positions for respective gear ratio steps and a neutral position and the range group synchronization device has only two shift positions to shift between two gear ratios steps. To accelerate range shifts, when synchronizing the range group, the main transmission input shaft is synchronized by controlling external synchronization aids to a target rotational speed at which either after the synchronization and shifting of the gear ratio step of the range group or independently from the current synchronization condition of the range group, the target gear ratio is engaged in the main transmission.

9 Claims, 4 Drawing Sheets

(56) References Cited

U.S. PATENT DOCUMENTS

| | | |
|---|---|---|
| 7,632,211 B2 | 12/2009 | Groner et al. |
| 8,152,691 B2 * | 4/2012 | Miller et al. .................. 477/124 |
| 2009/0071277 A1 * | 3/2009 | Bader et al. ................. 74/336 R |
| 2009/0107289 A1 * | 4/2009 | Borntrager ..................... 74/745 |

FOREIGN PATENT DOCUMENTS

| | | |
|---|---|---|
| DE | 10 2010 024 768 A1 | 1/2011 |
| EP | 0 471 491 A2 | 8/1991 |
| EP | 0 565 257 A1 | 3/1993 |
| EP | 0 683 336 A1 | 5/1995 |
| EP | 1 565 674 B1 | 4/2009 |
| WO | 2008/107318 A1 | 9/2008 |

OTHER PUBLICATIONS

International Search Report Corresponding to PCT/EP2012/063124 mailed Aug. 24, 2012.

Written Opinion Corresponding to PCT/EP2012/063124 mailed Aug. 24, 2012.

* cited by examiner

METHOD FOR SHIFT CONTROL OF AN AUTOMATED GROUP GEAR

This application is a National Stage completion of PCT/EP2012/063124 filed Jul. 5, 2012, which claims priority from German patent application serial no. 10 2011 080 849.3 filed Aug. 11, 2011.

FIELD OF THE INVENTION

The invention concerns a method for a shift control of an automated group gear.

BACKGROUND OF THE INVENTION

Automated group gears have been known for a while. They are preferably used in such commercial vehicles where a high number of gears and a large total spread are required. Dependent on the desired number of gear steps, they often comprise a multi-gear main gearbox in lay-shaft design and they also have, in this flow of force, a following two-step range group in a planetary design and/or, upstream in the flow of force, a split group in lay-shaft design. The group configuration, compared to the single gearbox, enables with a comparable number of gears clearly more compact dimensions and a lower weight. Since, depending on the gear change, simple shifting is possible in a gear group and also relatively complicated combinations of gear ratio step changes in several partial gearboxes, shifting takes place preferably fully automated or partially automated. As automated shift transmissions, these group gear boxes offer, compared to manual shift transmissions, increased operating comfort while avoiding operating errors.

In a general shift sequence with gear ratio changes in partial gearboxes, the shift phases in the partial gearboxes take place sequentially, wherein after the load reduction at the drive motor the main gearbox is shifted into neutral, thereafter another partial gearbox will be released and after the other partial gearbox has shifted, the gear in the main transmission is shifted and is synchronized by means of a synchronizer.

However, the inertia of the rotating masses of the gearbox, which need to be synchronized during gear changes, create relatively long shift durations. Long shift durations develop in particular in a range shift where first a range group needs to be shifted between a lower and an upper gear range, and thereafter also the synchronization has to be achieved with a gear change of the main transmission. Shifting of the range group can hereby take a relatively long time. A range shift is therefore often considered by the driver as disturbing and can also have an effect with regard to the dynamics of the drive operation.

Known from the WO2008/107318 A1 is a group transmission with a main transmission, a split group and a range transmission in which the main transmission and the following range group are designed as unsynchronized and the upstream split group is synchronized. The synchronization device of the split group can be connected and disconnected from the drive motor by a separation clutch. The range group is equipped with a simple planetary gear set which can be shift between a low speed drive step, in accordance with the planetary gear ratio, and a high-speed drive step, in accordance with a direct coupling between the main transmission and output, as well as a neutral position.

A shift sequence diagram for this gearbox provides that, during a range shift in the main transmission and range group, in each case a change between two gear ratios steps takes place, wherein the range group and the main transmission can be shifted in opposite directions. During the shift and after disengagement of the separation clutch and the load reduction at the drive motor, the range group is shifted into neutral, so that the entire group transmission during the gear change is at least partially separated, and therefore completely free of load, from the drive motor and from the drive train at the output side, meaning from the wheels of the vehicle. Thereafter, the rotating free masses of the main transmission and the split group are slowed by means of a transmission brake to a reliable, shiftable low rotational speed for the disengagement. At the same time, the rotational speed of the motor starts to be adjusted to match the synchronous rotational speed of the target gear. The change of the gear ratio step in the main transmission and the change of the gear ratio step in the split group happen then in parallel. Thereafter, by at least partially engaging the separating clutch, the rotational speed of the free masses is accelerated to the rotational speed of the motor, in the direction parallel to the synchronous rotational speed of the target gear, and then the claw shifted range group is synchronized via a transmission main shaft. Thereafter, the new gear ratio step of the range group is actuated whereby, during a complete engagement of the separating clutch, the load increase of the drive motor starts and the gear change is therefore completed.

Known from EP 1 565 674 B1 is a group transmission having a main transmission, a split group and a range group, in which the main transmission is manually shifted by means of a hand shift device, and the gear ratio of the split group and the range group are preselected via the hand shift device. During a range shift, the recognition of the neutral position in the main transmission initiates the shifting of the range group. During the shift of the range group, the target gear ratio is selected in the main transmission, wherein servo assistance for shifting of the gear ratio step in the main transmission is delayed, and is preferably released only after shifting of the range group, to reduce strong shift sounds and the wear and tear.

SUMMARY OF THE INVENTION

Based on this background, the object of the invention is to present a method for controlling the shifting of an automated group gear box with synchronized partial gearboxes, which enables short shift times.

The invention is based on the knowledge, that in an automated group gearbox with drivingly synchronized partial gearboxes, these partial gearboxes, by the use of gearbox internal synchronisations and external synchronization tools, can be timely synchronized in parallel, and their gear ratio steps can be shifted in overlapping shift operations, by means of which significantly shorter shift times can be achieved.

Thus, the invention presents a method for controlling the shifting of an automated group gear box, wherein the group transmission has at least a multi-step main transmission and a two-step range group which is, when viewed in the flow of drive, downstream of the main transmission and connected therewith by a main shaft, wherein an input shaft of the main transmission can be operationally connected or is connected with a drive device and in which the main transmission and the range group have synchronization devices with shift clutches, wherein the synchronization devices for the main transmission each have two shift positions for the respective gear ratios steps and a shift position for neutral, wherein the at least one synchronization device of the range group has exclusively two shift positions for the respective gear ratios steps and where, during a range shift, in the main transmission as well and is in the range group a change takes place between two gear ratios steps.

To achieve the objective, the invention provides that, during a range shift while the range group is synchronized, the input shaft of the main transmission, which was previously shifted into neutral, is synchronized to a target rotational speed by controlling external synchronization aids which have an effect at the input shaft, and that after reaching the target rotational speed, selectively either after the synchronization and shifting of the gear ratio step of the range group, or independent of the present synchronization condition of the range group, the new gear ratio step is activated in the main transmission.

The term target rotational speed is to be understood as being the rotational speed of a range group which is established from the actual output rotational speed of the output of the gearbox with the newly shifted gear at the input of the gearbox.

The method enables parallel shifting sequences in group gear boxes in which at least two serially positioned gearbox groups are designed with synchronization devices. Thus, significant shortening of the total shift times can be achieved in comparison with sequential shifting group gearboxes. Basically, such gearbox groups which are serially configured and positioned cannot use their internal synchronization shift aids at the same time, if they could work against each other. However, parallel synchronization of gearbox groups is realized with the inventive method in that the front group near the motor, meaning the main transmission, is synchronized with an external synchronization aid, for instance a combustion engine and a starting clutch or separating clutch, respectively, while the rear group, meaning the range group, is synchronized through its own synchronization device.

In particular, the synchronized rotational speed of the main transmission may already be set during the synchronization procedure of the range group by means of the drive motor and the start clutch or separating clutch, respectively, and the new gear ratio step in the main transmission can be shifted before the completion of the synchronization procedure of the range group. It is hereby not required to completely separate the entire drive train when shifting the drive or output, respectively. Thus, the range group at the output side can be operated with a shift device without a neutral position, which has a positive effect in regard to the manufacturing cost.

External synchronization aids can be provided by way of a combustion engine and/or a controllable separating clutch which is positioned between the combustion engine and the input shaft of the main transmission and/or an electric machine which is operationally connected with the main transmission and/or a controllable gearbox brake and/or a controllable hydraulic pump and/or a controllable aggregate such as an auxiliary output. Basically, external synchronization aids can be any of the elements which are suitable to create positive or negative torque at the drive train.

Thus, the invention can also easily be used in a vehicle with a parallel hybrid drive, in which adjustment of the target rotational speed at the input shaft can take place selectively by means of an available electric machine as the drive device.

It needs to be noted in the use of external synchronization aids, that the general internal synchronization devices usually designed as locking synchronizers that adjust, via a friction clutch, the rotational speed of the other shift devices, and which allow the positive shift of the gear, only after the completion of the synchronization, are not unintentionally stressed or being unlocked. The torque gradients of the external synchronization aids are therefore, when the method is executed, reasonably adjusted below the torque gradients of the internal synchronizations or are limited to such a threshold. Preferably, to increase the shift safety and for the reduction of the stress of the shift elements, the synchronization torque of the external synchronization aids is reduced during shifting of the gear, Basically, such external synchronization aids can also be utilized for the support of internal synchronizations in partial gearboxes, in particular then when the partial gearboxes are actuated either at the same time or overlapping within a certain time interval.

It can also be provided that, during the shifting of the gear ratio of the main transmission and/or during the shifting of the gear ratio of the range group, a separating clutch which was previously engaged or partially engaged needs to be temporarily disengaged or partially disengaged. Thus, the separating clutch between the motor connection and transmission input can remain completely engaged or partially engaged during the actuating procedure of the partial gearboxes or the separating clutch, which was previously engaged or partially engaged, can be disengaged or partially disengaged when the target rotational speed at the drive motor has been reached.

Because the target rotational speed which needs to be established, meaning the input rotational speed for the new gear which needs to be adjusted, is created through the product of the output rotational speed and the gear ratio of the targeted gear, the adjusted target rotational speed at the drive motor can deviate from the correct target rotational speed when there is inaccurate knowledge of the output rotational speed. A resulting faulty rotational speed will be thereafter compensated for by the internal synchronization of the gearbox groups, whereby the synchronization produces work and therefore it uses kinetic energy. This work can be minimized when, to overcome a possible faulty rotational speed, the internal synchronization only has to synchronize the mass inertia of the respective gearbox parts but not torque which is transferred through the separating clutch. In this case, the separating clutch can again be temporarily disengaged or partially disengage during the actuation procedure of the partial gearboxes. Also, possible shifting delays can be omitted or at least reduced.

The invention provides alternative possibilities to synchronize a target gear during range shifting. Thus, the method enable the possibility of making decisions with regard to which particular alternative should be used. The boundary conditions which can hereby be used are in particular the wear and tear condition of the gearbox-internal synchronizations and/or the dynamics of the drive motor during the synchronization compared to the dynamics of the gearbox-internal synchronization and/or the sound creation during the synchronization of a drive engine designed as combustion engine, due to a rotational speed gradient.

In a drive train, in which the synchronization of the input shaft of the main transmission can be carried out by means of the control of a combustion engine and a separating clutch, and when the range group is designed as two-stages, an embodiment of the invention can provide the following method steps:

Disengagement of the separating clutch to the combustion engine and a load decrease at the combustion engine Shifting of the gear ratio step of the range group and starting the change of the gear ratio step of the main transmission, as well as adjusting the rotational speed of the combustion engine towards the target rotational speed of the target gear of the range shift and the input shaft of the main transmission, through Shifting of the main transmission to neutral, Waiting for the main transmission to reach the target rotational speed by use of the combustion engine, Engagement or partial engagement of the separating clutch after completing the shift of the range group, Shift of the new gear ratio step in the main transmission Complete engagement of the separating clutch to the combustion engine and load increase at the combustion engine.

Thus, the combustion engine is brought to the target rotational speed of the gear which needs to be shifted. Through the engagement or partial engagement, respectively, of the separating clutch, the input shaft is also adjusted to this rotational speed. As a result hereby, the main transmission is synchronized and prepared for the actuation of the main transmission gear ratio. Thus, synchronization of the main transmission does not have to undertake any work during the actuation of the main transmission.

Depending on the duration of the synchronization procedure of the range group and the dynamics of the external synchronization aids, in particular the dynamics of the system with the combustion engine and the separating clutch, the main transmission gear can be shifted immediately after the actuation of the range group, if, within the shift timing of the range group, the combustion engine has already reached the target rotational speed, or within a short wait time in the range group which has already been shifted, as soon as the combustion engine has reached the target rotational speed. The possible wait time is however in each case shorter as compared to the common, sequential shift patterns in the partial gearboxes. Thus, a significant reduction of the total shift time can be achieved and the shifting comfort can be increased.

Therefore, the above embodiment provides, in each case, to wait with the actuation of the main transmission until the target gear ratio of the range group has been shifted. The internal synchronization of the main transmission is hereby under much less stress.

The following sequence can be provided in an alternative embodiment:

Disengagement of the separating clutch to the combustion engine and load decrease at the combustion engine Change of the gear ratio step of the main transmission and start of the shifting of the gear ratio step of the range group, as well as starting adjustment of the rotational speed of the combustion engine to the target rotational speed of the target gear of the range shifting at the input shaft of the main transmission, through Shifting of the main transmission to neutral Waiting for the main transmission to reach the target rotational speed by way of the combustion engine Engagement or partial engagement of the separating clutch;

Shifting of the new gear ratio step in the main transmission

Support of an existing synchronization procedure of the range group through the internal synchronization of the main transmission Shifting of the new gear ratio step in the range group Completing engagement of the separating clutch to the combustion engine and load increase at the combustion engine Thus, the combustion engine is brought to the target rotational speed of the gear which needs to be shifted. By the engagement or partial engagement, respectively, of the separating clutch, the input shaft is also brought to this target rotational speed. As a result hereby, the main transmission is synchronized and the new main transmission gear ratio can be shifted from neutral without any delay.

If the main transmission is now shifted and the synchronization procedure of the range group has not been completed, then the internal synchronization of the main transmission works on one side and the synchronization of the range group on the other side of the transmission main shaft which is the drive system for both partial transmissions. However, since both synchronizations synchronize the main shaft of the transmission in the same direction and towards the same rotational speed, the synchronization procedure of the range group is shortened, and the selected range gearbox ratio can be shifted earlier. Thus, this results again in a shortened total shift time.

The method can also be executed preferably in an automated group transmission of a commercial vehicle, which has a main transmission designed with a lay shaft construction having several gear ratio steps, for instance five, which can be drivingly connected with a controllable separating clutch or starter clutch, respectively, where the range group which is designed in planetary construction follows downstream in the flow of drive, which can be shifted between a modified shift position of a gear ratio of the main transmission and a directly transferring shift position of a gear ratio of the main transmission.

However, it is not at all limited to such a transmission configuration or drive configuration, and can also be applied in other drive trains with at least two automated, synchronized gearbox groups which are positioned one after the other. For instance, the invention can also be applied in vehicles with a hybrid drive in such a gearbox, where an electric machine is coupled with an input shaft and the adjustment of the input target rotational speed can take place through the electric machine.

BRIEF DESCRIPTION OF THE DRAWINGS

To illustrate the invention, the description is accompanied by drawings. These show.

DETAILED DESCRIPTION OF THE PREFERRED EMBODIMENTS

Figure 1:
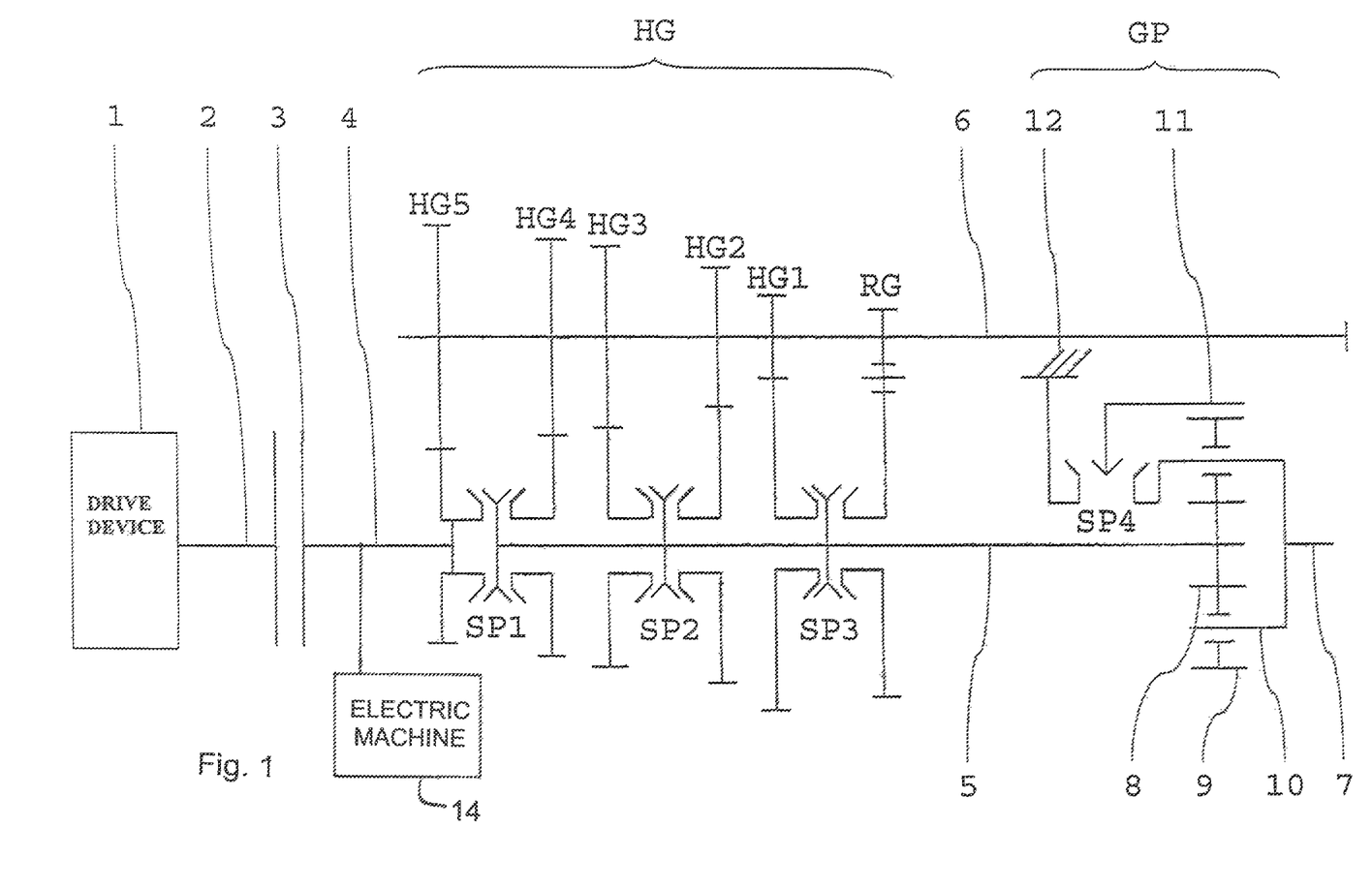
FIG. 1 a gearbox schematic of an automated group transmission with a main transmission and a range group, FIG. 2 a flow diagram of a rang shift in the group transmission in accordance with FIG. 1, FIG. 3 an alternative flow diagram of a range shift in the group transmission in accordance with FIG. 1, and FIGS. 4, 4A a gear diagram and a rotational speed pattern of a sequence scheme of a range shift in accordance with FIG. 3.

Thus, shown in FIG. 1 is a diagram of an automated group transmission, preferably for a commercial vehicle. The gearbox comprises a main transmission HG with five gearsets for forward gears, HG1, HG2, HG3, HG4, HG5 and a gearset for a reverse gear step RG, as well as a two-step range group GP.

The main transmission HG is designed as a lay-shaft transmission, with an input shaft 4 on the drive side, a main shaft 5 on the output side, and a lay shaft 6. The transmission ratio steps of the transmission gears HG1, HG2, HG3, HG4, HG5, RG of the main transmission HG comprising in each case a meshing gear wheel pair, and the reverse gear step RG has as recognized an additional rotatable intermediate wheel for the rotation reversal. Such a configuration is already known. Thus, further reference numbers for the gear wheels have been omitted.

The gear ratio step at the input side of the highest main transmission gear HG5 is designed as a direct drive, with a gear wheel pair which has a fixed gear that is connected in a rotationally fixed manner with the lay shaft 6 and a fixed gear which meshes with it and which is connected in a rotationally fixed manner with the input shaft 4. The input shaft 4 can be connected, via a separating clutch or starting clutch 3, with a driveshaft 2 of a drive device 1 which is designed as a combustion engine. The remaining gear steps HG1, HG2, HG3, HG4, RG comprise in each case a gear fixed to the lay shaft 6 and an idler gear which is rotatably positioned on the main shaft 5. It is possible that the vehicle comprises a parallel hybrid drive having an electric machine 14 (diagrammatically shown in FIG. 1) coupled to the input shaft which can adjust the target rotational speed of the input shaft.

The idle gears can be connected in a rotationally fixed manner with the main shaft 5 by way of synchronization devices which are designed as synchronized shift packages SP1, SP2, SP3, whereby these synchronized shift packages SP1, SP2, SP3 have shift positions for two gear steps, as well as a neutral position. Furthermore, the input shaft 4 can be directly connected with the main shaft 5 by means of the synchronized shift package SP1 in the input side for the shifting of a direct gear.

The range group GP is designed as a planetary transmission. It comprises a sun gear 8 which is connected in a rotationally fixed manner with the end of the extended main shaft 5, in the direction of the downstream following range group GP, a ring gear 11, as well as a planetary carrier 10, which supports several meshing planets 9 between the sun gear 8 and the ring gear 11, and which is, at the output side, connected in a rotationally fixed manner with an output or output shaft 7.

The range group GP can be shifted by means of an additional synchronized shift package SP4 between two shift positions. In a first shift position, the ring gear 11 is connected with a stationary part 12, such as a gearbox housing, so that the transmission ratio of the planetary transmission becomes effective at the output shaft 7. In a second shift position, the ring gear 11 is coupled with the planetary carrier 10 so that the planetary transmission rotates with the main shaft 5 as a block, and the output shaft 7 directly couples the main shaft 5. A neutral position is not provided for the synchronized shift package SP4 of the range group GP. Overall, the group transmission thus represents a 10-gear transmission.

Figure 2:
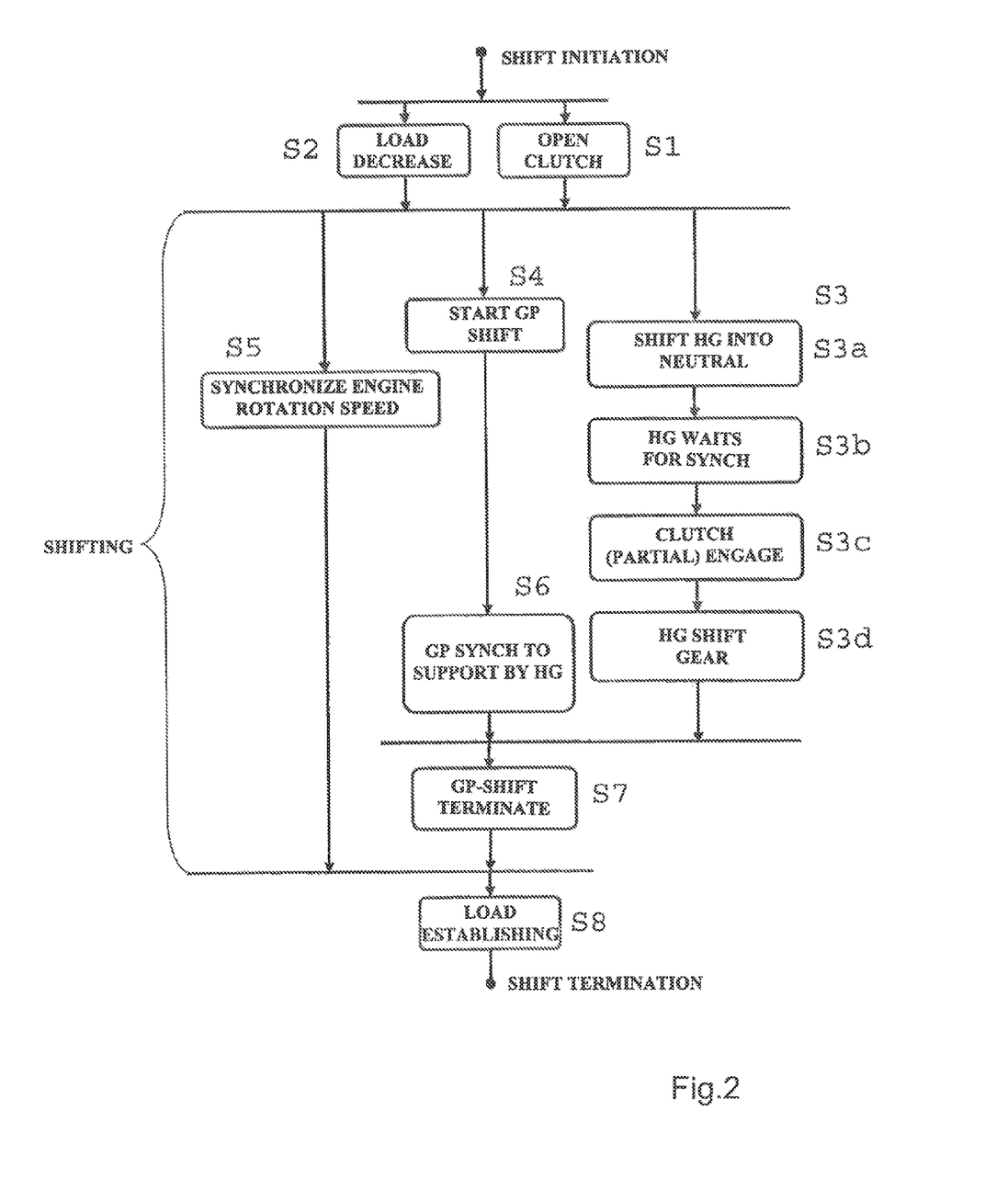

FIG. 2 shows an example shift sequence for a range shift of such gearbox. Gear ratio changes take place in both partial transmissions HG, GP.

This relates, in the exemplary transmission in accordance with FIG. 1, to an upshift or downshift between a fifth gear G5 and a sixth gear G6 wherein, in the opposite shift direction, the range group GP is shifted between a lower and an upper gear range GP1, GP2 and the main transmission HG is shifted between the first gear HG1 and the fifth gear HG5. For the sequence which is shown in FIG. 2, a gear change is assumed in the following from the sixth gear G6 to the fifth year G5.

Shifting is initiated after a request for a gear change which requires a range shift, In the beginning, the separating clutch 3 is disengaged in one step Si, and in parallel, in step S2, the load at the combustion engine 1 is reduced.

Thereafter and during step 53 and step S4, the change of the gear ratio of the main transmission HG and the change of the gear ratio of the range group GP are simultaneously initiated. Hereby, the main transmission HG is shifted into neutral in an intermediate step S3a and remains in this position in an intermediate step S3b during a wait time while the rotational speed of the combustion engine 1 is brought towards the target rotational speed of the new gear in a step S5. When the target rotational speed is reached, the separating clutch 3 is prefer- ably partially engaged in an intermediate step S3c, and the new gear ratio is immediately shifted in the main transmission HG during an intermediate step S3d.

The shifting of the range group GP is at this time not finished and thus, the synchronized shift package SP4 of the range group GP is still active. Since the two partial transmissions HG, GP are in a drive connection with each other through the main shaft 5, the initiation of the main transmission HG, previously externally synchronized through the rotational speed guidance of the combustion engine 1 and the engagement or partial engagement, respectively, of the separating clutch 3, causes its internal synchronized shift package SP1 to become active. In the following, the synchronized shift package SP1 of the main transmission HG and the synchronized shift package SP4 of the range group GP are synchronizing the main shaft 5 towards the same rotational speed, whereby prior to this the calculated target rotational speed, resulting from the output rotational speed and the gear ratio of the target gear G6, has been adjusted. Synchronization of the range group GP is therefore rapidly completed in a step 36, so that the range group GP can be shifted faster compared to what was possible up to now, in a step S7 into the targeted range. Thereafter, the load increase at the combustion engine 1 takes place in a step S8, wherein the separating clutch 3, which may have been previously partially engaged, will be completely engaged and the gear change is complete.

Figure 3:
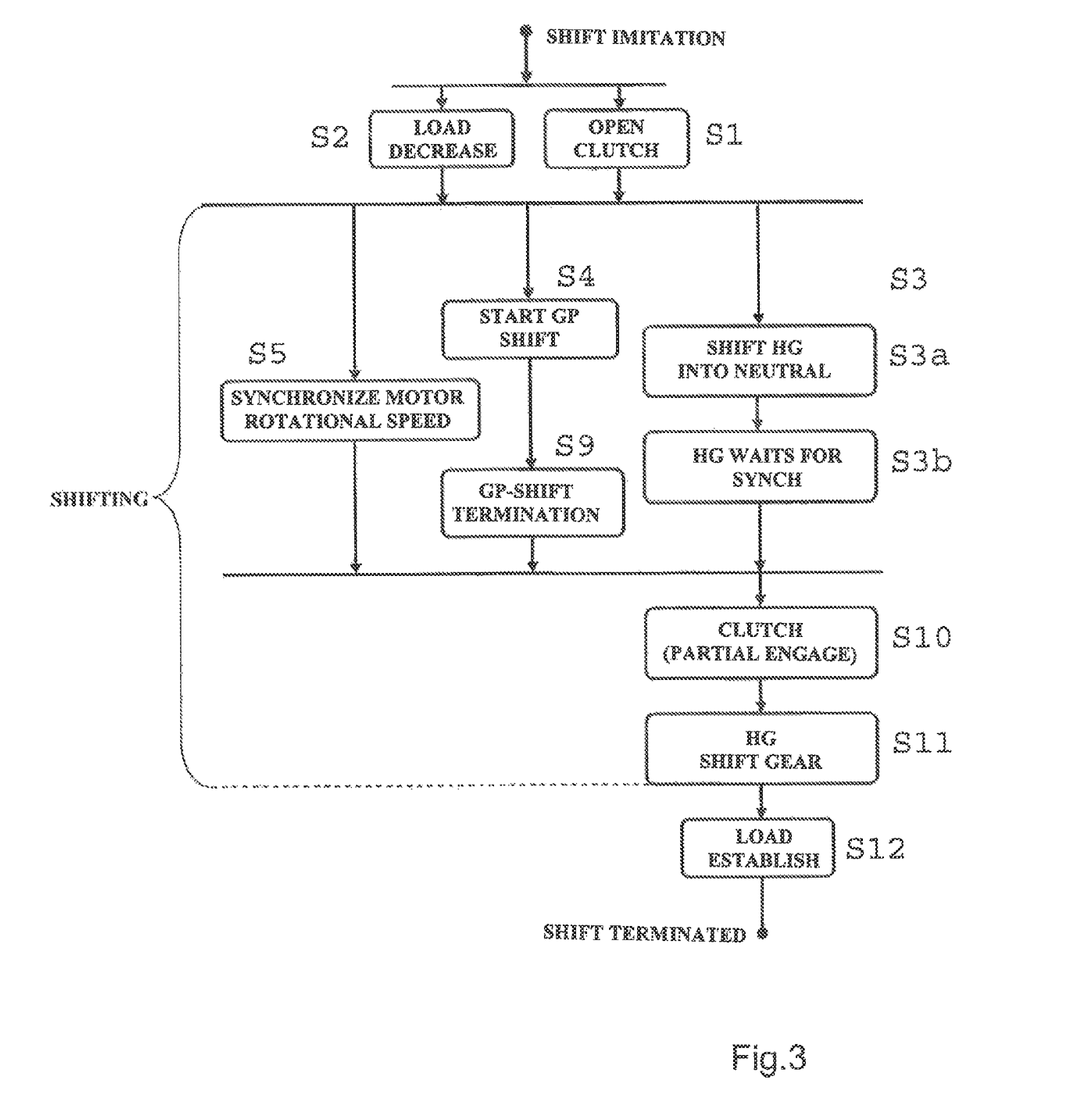
Figure 4:
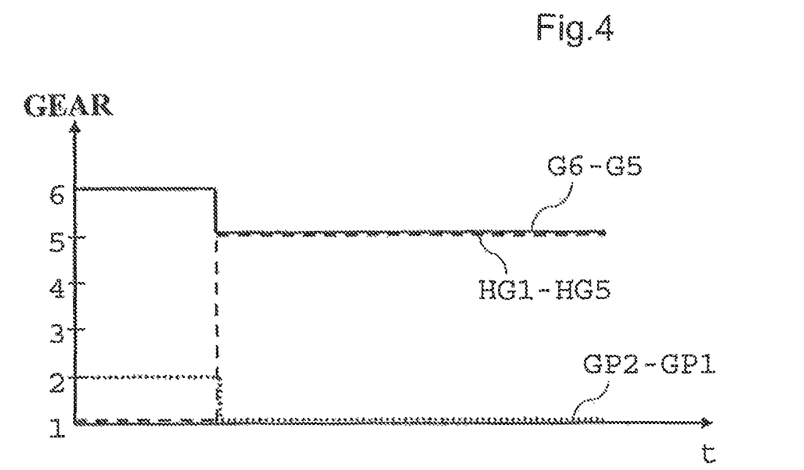
Figure 4A:
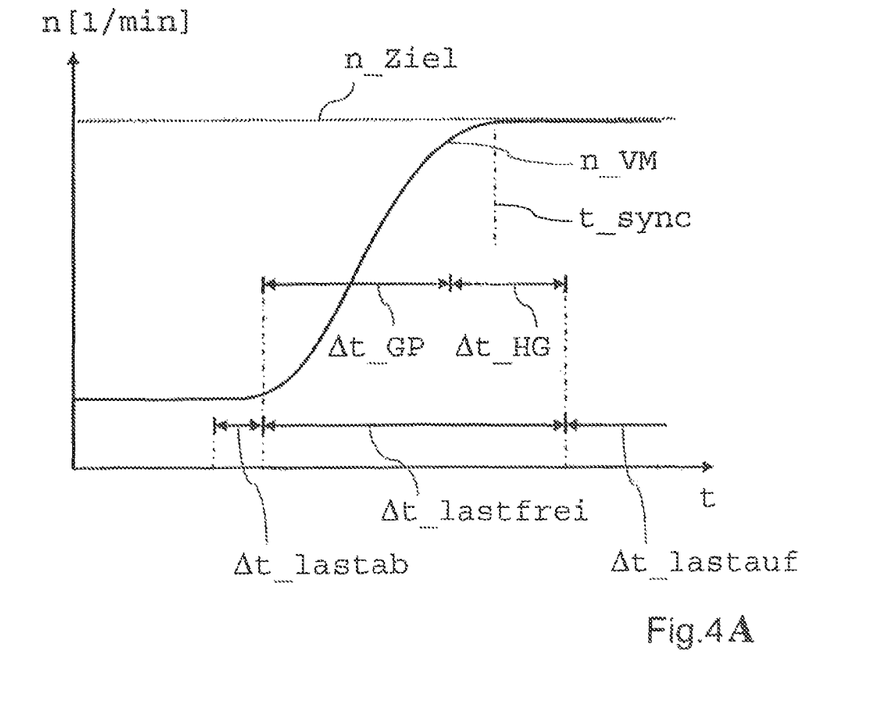

FIG. 3 shows an alternative shift sequence of a range shift from a sixth gear G6 to a fifth gear G5 for the group gearbox in accordance with FIG. 1. A gear diagram as well as a rotational speed diagram, are presented respectively in FIGS. 4 and 4A. Thus, the main transmission HG is shifted from a first main transmission gear HG1 to a fifth main transmission gear HG5, whereby initially the synchronized package SP3 is shifted into neutral and after an external synchronization of the input shaft 4 through the combustion engine 1 and the initiation of the main transmission HG, the related synchronized package SP1 of the fifth gear G5 is moved into the respective shift position. The range group GP is hereby shifted in parallel to it, through a direct change of the shift position of the respective synchronized package SP4 from the upper gear range GP2 to a lower gear range GP1.

During the shift sequence in accordance with FIG. 3, after the disengagement of clutch 3 in step S1 and the load reduction in the time interval $\Delta t\_lastab$ in step S2, shifting is again initiated in the range group GP, as well as shifting in the main transmission HG. The main transmission HG is hereby shifted in an intermediate step S3a into neutral. For shifting the range group GP, a time interval of $\Delta t\_GP$ is assumed, and for the gear ratio change of the main transmission HG a time interval $\Delta t\_HG$. Within the total shifting time $\Delta t\_lastfrei$, the drive train has no torque.

During synchronization of the range group GP, the synchronization rotational speed of the main group HG is adjusted by means of the combustion engine 1 and the separating clutch 3. Hereby, the rotational speed n_VM of the combustion engine 1 is brought to the target rotational speed n_Ziel which is reached at the time point t_synch. Herein, the main transmission HG remains in a wait position in an intermediate step S3b.

Contrary to the shift sequence in accordance with FIG. 2, the main transmission gear HG5 is, however, shifted at the time when during a step 59 shifting of the range group GP into the lower gear range GP2–GP1 has been completed. After this range change, the clutch 3 is engaged or partially engaged, respectively, in a step S10 and at that time, the target rotational speed is adjusted at the input shaft 4. The main transmission gear HG5, because the main transmission HG is now already synchronized via the external synchronization by means of the combustion engine 1 and the clutch 3, can be immediately shifted in a step S11, meaning that the synchronization package SP1 is brought into the respective shift position. Thus, the internal synchronization does not have any task to accomplish because the synchronization already took place when the gear was shifted. Thereafter, the load increase follows in step S12 during a time interval Δt_lastauf, whereby the clutch 3 is completely engaged, if this did not already happen.

In the case that shifting of the range group GP has been completed before reaching the target rotational speed of the combustion engine 1, the main transmission HG is immediately shifted without delay after the external synchronization.

REFERENCE CHARACTERS

1 Combustion Engine, Drive Device
2 Drive Shaft
3 Separating Clutch
4 Input Shaft
5 Main Shaft
6 Countershaft
7 Output Shaft, Output Drive Shaft
8 Sun Gear
9 Planetary Gear
10 Planetary Carrier
11 Ring Gear
12 Stationary Part, Transmission Enclosure
G5 Fifth Gear
G6 Sixth Gear
GP Range Group
GP1 Lower Gear Range
GP2 Upper Gear Range
HG Main Transmission
HG1 First Main Transmission Gear
HG2 Second Main Transmission Gear
HG3 Third Main Transmission Gear
HG4 Fourth Main Transmission Gear
HG5 Fifth Main Transmission Gear
n Rotational speed
n_VM Motor Rotational speed
n_Ziel Target Rotational speed
RG Reverse Gear Step
S1-S12 Shift Step
SP1 Synchronization Device, Synchronization Shifting Package
SP2 Synchronization Device, Synchronization Shifting Package
SP3 Synchronization Device, Synchronization Shifting Package
SP4 Synchronization Device, Synchronization Shifting Package
t Time
t_synch Synchronization Time Point
Δt_GPShift Time of Range Group
Δt_HG Shift Time of Main Transmission
Δt_lastab Load Reduction Time Interval
Δt_lastfrei No-Load Time Interval
Δt_lastauf Load Increase Time Interval

The invention claimed is:

1. A method of shift control of an automated group gearbox, the group gearbox having at least a multi-step main transmission (HG) and at least a two-step range group (GP) which is positioned, in a flow of drive, downstream from the multi-step main transmission, and the two-step range group (GP) is connected with the multi-step main transmission via a main shaft (5), an input shaft (4) of the main transmission (HG) is either drive connected or drivingly connectable with a drive device (1), the main transmission (HG) and the range group (GP) have synchronization devices (SP1, SP2, SP3, SP4) with shift clutches, the synchronization devices (SP1, SP2, SP3) of the main transmission (HG) are each shiftable to three shift positions comprising first and second shift positions for engagement of two respective gear ratio steps and a third shift position being a neutral position, at least one synchronization device (SP4) of the range group (GP) is only shiftable to two shift positions for engagement of two respective gear ratio steps and in which during a range shifting, in each of the main transmission (HG) and in the range group (GP), a change takes place between the two gear ratio steps, the method comprising the steps of:

initiating a gear shift in the group gearbox which comprises a shin in the range group from one gear ratio step directly to another gear ratio step;

shifting the main transmission to neutral;

simultaneously initiating synchronization of the range group (GP), and synchronization of a rotational speed of the input shaft (4) of the main transmission (HG) to a target rotational speed (n_Ziel) by controlling at least one external synchronization aid (1, 3) which is external to the main transmission and has an effect on the rotational speed of the input shaft (4); and shifting a new gear ratio step in the main transmission after the rotational speed of the input shaft of the main transmission reaches the target rotational speed, and either after the synchronization and shifting of the gear ratio step of the range group (GP) or independently from a current synchronization condition of the range group (GP).

2. The method according to claim 1, further comprising the step of completing the shift to the new gear ratio step in the main transmission (HG) before synchronization of the range group (GP) is complete.

3. The method according to claim 1, further comprising the step of providing, as the external synchronization aid, at least one of:
a combustion engine (1),
a controllable separating clutch (3), which is positioned between the combustion engine (1) and the input shaft (4) of the main transmission (HG),
a controllable transmission brake,
a controllable hydraulic fluid pump, and
a controllable aggregate as an auxiliary drive.

4. The method according to claim 1, further comprising the step of adjusting, in a vehicle with a parallel hybrid drive, the target rotational speed of the input shaft (4) via an available electric machine as the drive device.

5. The method according to claim 1, further comprising the step of, at least one of during the shifting of the gear ratio of the main transmission (HG) and during the shifting of the gear ratio of the range group (GP), either temporarily disengaging or partially disengaging either a previously engaged or partially engaged separating clutch (3).

6. The method according to claim 1, wherein the range group (GP) is a two-stage design and the method further comprising the steps of, when synchronization of the input shaft (4) of the main transmission (HG) occurs by controlling a combustion engine (1) and a separating clutch (3):

disengaging the separating clutch (3) and decreasing a load of the combustion engine (Step S1, Step S2), shifting of the gear ratio step of the range group (GP) and starting of the change of the gear ratio step of the main transmission (HG), adjusting the rotation speed of the combustion engine (1) towards the target rotational speed of the target gear of the range shifting at the input shaft (4) of the main transmission (Step S3, Step S4, Step S5), by:

shifting of the main transmission (HG) into neutral (Step S3a), waiting for the main transmission (HG) to reach the target rotational speed through adjustment of the combustion engine (Step S3b), completing the shifting of the gear ratio step of the range group;

either engaging or partially engaging the separating clutch (3) (Step S10), after completion of the shift of the range group (Step S6), shifting the new gear ratio step in the main transmission (Step S11), completing engagement of the separating clutch (3) and increasing the load of the combustion engine (Step S12).

7. The method according to claim 1, wherein the range group (GP) has a two-stage design and the method further comprising the steps of, when synchronization of the input shaft (4) of the main transmission (HG) occurs by controlling a combustion engine (1) and the separating clutch (3):

disengaging the separating clutch (3) and decreasing a load of the combustion engine (Step S1, Step S2), changing the gear ratio step of the main transmission (HG) and starting the shifting of the gear ratio step of the range group (GP), a starting rotational speed guidance via the combustion engine (1) towards the target rotational speed of the target gear of the range shifting at the input shaft (4) of the main transmission (Step S1, Step S2, Step S3), with shifting of the main transmission (HG) into neutral (Step S3a), waiting for the main transmission (HG) to reach the target rotational speed through control of the combustion engine (Step S3b), either engaging or partially engaging the separating clutch (Step S3c), shifting of the new gear ratio step in the main transmission (Step S3d), assisting synchronization of the range group (GP) by synchronization (SP1, SP2, SP3) of the main transmission (Step S6) with a synchronization device that is internal to the main transmission, shifting of the new gear ratio step of the range group (Step S7), completing engagement of the separating clutch (3) and increasing the load of the combustion engine (1) (Step S8).

8. The method according to claim 1, further comprising the step of executing the method in an automated group gearbox of a commercial motor vehicle in which the main transmission (HG) has a lay shaft design with five gear ratios steps (HG1, HG2, HG3, HG4, HG5), which are drivingly connected with the drive device which is designed as a combustion engine (1), and where the range group (GP), which is positioned downstream after the main transmission (HG), and is designed in a planetary configuration which is shiftable between a modified shift position of the gear ratio of the main transmission and a directly transferring shift position of the gear ratio of the main transmission (HG).

9. A method of shift control of an automated group gearbox, the group gearbox having at least a multi-step main transmission (HG) and at least a two-step range, group (GP) which is positioned, in a flow of drive, downstream from the multi-step main transmission, and the two-step range group (GP)is connected with the multi-step main transmission via a main shaft (5), an input shaft (4) of the main transmission, (HG) is either drive connected of drivingly connectable with a drive device (1), the main transmission (HG) and the range group (GP) have synchronization devices (SP1, SP2, SP3, SP4) with shift clutches, the synchronization devices (SP1, SP2, SP3) of the main transmission (HG) each have two shift positions for respective gear ratio steps and a shift position for a neutral position, at least the one synchronization device (SP4) of the range group (GP) exclusively having two shift positions for respective gear ratio steps and in which during a range shifting, in each of the main transmission (HG) and in the range group (GP), a change takes place between two gear ratio steps, the method comprising the steps of:

in a range shifting, during the synchronization of the range group (GP), synchronizing the input shaft (4) of the main transmission (HG), which was previously shifted into neutral, to a target rotational speed (n_Ziel) by controlling at least one external synchronization aid (1, 3) having an effect at the input shaft (4);

after reaching the target rotational speed, either after the synchronization and shifting of the gear ratio step of the range group (GP) or independently from the current synchronization condition of the range group (GP), shifting a new gear ratio step in the main transmission (HG); and limiting a gradient of torque, when controlling the external synchronization aid (1, 3), which has an effect at the input shaft (4) to a threshold value, which is positioned below at least one of a maximally allowed load torque and a lock torque of the internal synchronization devices (SP1, SP2, SP3, SP4) of the main transmission (HG).

* * * * *